(12) United States Patent
Hochstetler et al.

(10) Patent No.: US 10,826,342 B2
(45) Date of Patent: Nov. 3, 2020

(54) PERMANENT MAGNET GENERATOR ROTOR FOR INTEGRATED DRIVE GENERATOR

(71) Applicant: HAMILTON SUNDSTRAND CORPORATION, Charlotte, NC (US)

(72) Inventors: Derek R. Hochstetler, Rockford, IL (US); Ted A. Martin, Byron, IL (US); Duane C. Johnson, Beloit, WI (US); Glenn C. Lemmers, Jr., Loves Park, IL (US); Diego Rocha, Rockford, IL (US)

(73) Assignee: Hamilton Sunstrand Corporation, Charlotte, NC (US)

( * ) Notice: Subject to any disclaimer, the term of this patent is extended or adjusted under 35 U.S.C. 154(b) by 316 days.

(21) Appl. No.: 15/820,562

(22) Filed: Nov. 22, 2017

(65) Prior Publication Data

US 2019/0157927 A1 May 23, 2019

(51) Int. Cl.
*H02K 1/27* (2006.01)
*H02K 1/28* (2006.01)
*H02K 21/14* (2006.01)

(52) U.S. Cl.
CPC .............. *H02K 1/278* (2013.01); *H02K 1/28* (2013.01); *H02K 21/14* (2013.01); *H02K 2213/03* (2013.01)

(58) Field of Classification Search
CPC .......... H02K 1/278; H02K 1/28; H02K 21/14; H02K 2213/03
USPC .............. 310/89, 156.28, 156.29, 156.31
See application file for complete search history.

(56) References Cited

U.S. PATENT DOCUMENTS

| | | | | |
|---|---|---|---|---|
| 7,075,204 B2* | 7/2006 | Shiao | ..................... | H02K 5/128 310/156.12 |
| 7,250,688 B2* | 7/2007 | Thomson | ................ | F02C 7/275 290/31 |
| 8,878,409 B2* | 11/2014 | Legros | ..................... | H02K 1/28 310/156.31 |
| 2002/0079770 A1* | 6/2002 | Lai | ........................ | H02K 1/278 310/156.28 |

(Continued)

FOREIGN PATENT DOCUMENTS

| | | |
|---|---|---|
| CN | 205647059 | 10/2016 |
| JP | S6013456 | 1/1985 |

(Continued)

OTHER PUBLICATIONS

Yamada et al., English Machine Translation of JP 2015-023726 (Year: 2015).*

(Continued)

*Primary Examiner* — Tulsidas C Patel
*Assistant Examiner* — Rashad H Johnson
(74) *Attorney, Agent, or Firm* — Carlson, Gaskey & Olds, P.C.

(57) ABSTRACT

A rotor for a permanent magnet generator includes a rotor body extending between a first end and a second end, having a cylindrical bore and a plurality of flats on an outer peripheral surface. Permanent magnets are positioned at the flats. An outer ring surrounds the permanent magnets and defines an outer diameter. A ratio of the outer diameter to an axial length between the first and second ends is between 3.2 and 3.4. An integrated drive generator and a method are also disclosed.

9 Claims, 2 Drawing Sheets

(56) References Cited

U.S. PATENT DOCUMENTS

| | | | | |
|---|---|---|---|---|
| 2007/0132322 A1* | 6/2007 | Chiang | ............... | H02K 3/524 |
| | | | | 310/49.31 |
| 2009/0160281 A1* | 6/2009 | Rasmussen | ............ | H02K 1/278 |
| | | | | 310/156.12 |
| 2014/0062245 A1* | 3/2014 | Taniguchi | ............ | H02K 1/2746 |
| | | | | 310/156.28 |

FOREIGN PATENT DOCUMENTS

| | | |
|---|---|---|
| JP | H10248185 | 9/1998 |
| JP | 2015023726 | 2/2015 |
| JP | 2015100202 | 5/2015 |

OTHER PUBLICATIONS

The Extended European Search Report for EP Application No. 18207486.4, dated Apr. 9, 2019.

Boglietti, A, et al. (2009) The safety critical electric machines and drives in the more electric aircraft: A survey. IECON 2009—35th Annual Conference of IEEE Industrial Electrics. Nov. 3-5, 2009. pp. 2587-2594. Porto, Portugal.

Choi, J., et al. (2010) Design of a direct-coupled radial-flux permanent magnet generator for wind turbines. 2010 IEEE Power and Energy Society General Meeting. Jul. 25-29, 2010. pp. 1-6. Minneapolis, Minnesota.

\* cited by examiner

US 10,826,342 B2

PERMANENT MAGNET GENERATOR ROTOR FOR INTEGRATED DRIVE GENERATOR

BACKGROUND

This application relates to a permanent magnet generator rotor for use in an integrated drive generator.

Integrated drive generators are known and often utilized in aircraft. As known, a gas turbine engine on the aircraft provides a drive input into a generator input shaft. The generator typically includes a disconnect shaft that can transmit the input into a gear differential. The gear differential selectively drives a main generator to provide electric power for various uses on the aircraft.

It is desirable that the generated power be of a desired constant frequency. However, the speed from the input shaft will vary during operation of the gas turbine engine. This would result in variable frequency.

Integrated drive generators are provided with speed trimming hydraulic units. Gears associated with the differential and, in particular, a ring gear portion, provide rotation from the differential back into the trimming unit. A carrier also rotates another portion of the trimming unit. The trimming unit is operable to result in the output speed of the differential being effectively constant, such that electric power of a desirable frequency is generated.

The generator is mounted between two housing portions and a seal plate is mounted between the two housing portions.

In addition, a permanent magnet generator is provided which generates power for some accessory functions. A rotor associated with this permanent magnet generator has design challenges.

SUMMARY

A rotor for a permanent magnet generator includes a rotor body extending between a first end and a second end, having a cylindrical bore and a plurality of flats on an outer peripheral surface. Permanent magnets are positioned at the flats. An outer ring surrounds the permanent magnets and defines an outer diameter. A ratio of the outer diameter to an axial length between the first and second ends is between 3.2 and 3.4. An integrated drive generator and a method are also disclosed.

These and other features may be best understood from the following drawings and specification.

DETAILED DESCRIPTION

Figure 1:
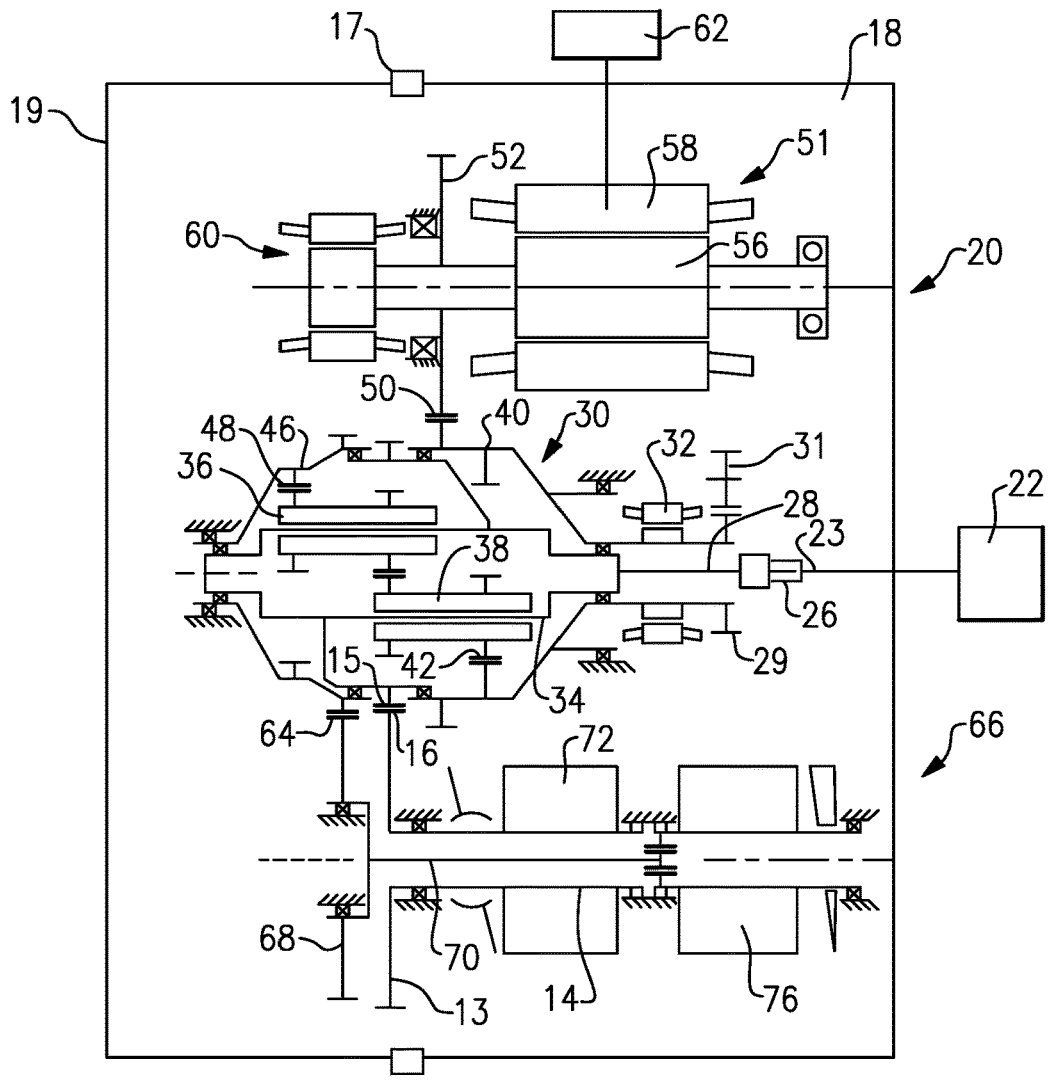
FIG. 1 schematically shows an integrated drive generator.

FIG. 1 shows an integrated drive generator 20. As shown, housing portions 18 and 19 surround the integrated drive generator and a seal plate 17 sits between the housing portions 18 and 19.

A gas turbine engine 22 may drive an input shaft 23 which selectively drives a disconnect assembly 26. The disconnect assembly 26, in turn, drives a carrier shaft 28, which drives a carrier in a gear differential 30.

As the carrier shaft 28 rotates, planet gears 36 and 38 are caused to rotate. Gears 38 have a gear interface 42 with a first ring gear portion 40. Gears 36 have a gear interface 48 with a second ring gear portion 46.

Ring gear portion 40 has a gear interface 50 with a main generator 51 having a drive gear 52. When drive gear 52 is driven to rotate, it rotates a rotor 56 associated with a stator 58 of the main generator as well as an exciter rotor 60. Electric power is generated for a use 62, as known.

It is desirable that the frequency of the generated electric power be at a desired frequency. This requires the input speed to gear 52 to be relatively constant and at the desired speed. As such, the speed of the input shaft 23 is added to the speed of the speed trimmer 66 to result in a constant input speed to gear 52.

A gear 15 that is part of the carrier has a gear interface 16 with a gear 13 driving a shaft 14 also within the speed trimmer.

As known, the speed trimmer 66 includes a variable unit 72 and a fixed unit 76. The units 72 and 76 may each be provided with a plurality of pistons and a swash plate arrangement. If the input speed of the gear 13 is too high, the speed of the gear 52 will also be too high, and hence, the speed trimmer 66 acts to lower the speed of the trim gear 46 which will drop the speed of gear 52. On the other hand, if the input speed is too low, the speed trimmer will increase the trim gear speed and the speed seen by gear 52 will increase.

In essence, the variable unit 72 receives an input through gear 13 that is proportional to the speed of the input shaft 23. The variable unit 72 also receives a control input from a control monitoring the speed of the generator rotor 56. The position of the swash plate in the variable unit 72 is changed to in turn change the speed and direction of the fixed unit 76. The fixed unit 76 can change the speed, and direction of rotation of the shaft 70, and this then provides control back through the trim ring gear 46 to change the speed reaching the generator. In this manner, the speed trimmer 66 results in the frequency generated by the generator being closer to constant, and at the desired frequency.

A permanent magnet generator 32 rotates with the ring gear 40.

An accessory drive shaft 29 rotates with ring gear 40 and drives a plurality of accessory gears 31.

Figure 2:
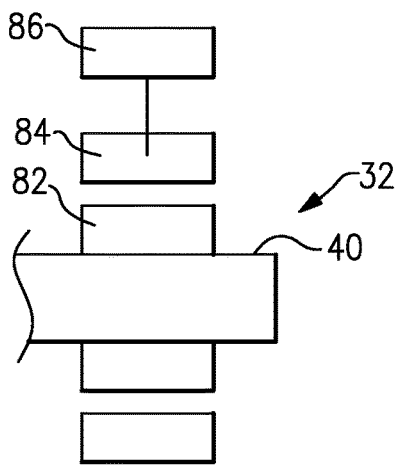
FIG. 2 shows a detail of a permanent magnet generator associated with the integrated drive generator.

FIG. 2 shows further details of the permanent magnet generator 32. The ring gear 40 has a portion supporting a rotor 82. The rotor 82 is driven to rotate adjacent a stator 84 and electricity is generated and sent to uses 86. The uses may include a generator control for main generator 51, for control and protection functions.

Figure 3A:
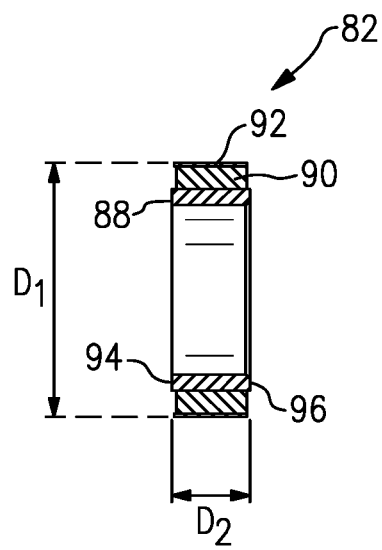
FIG. 3A shows a first view of a rotor.

FIG. 3A shows details of the rotor 82. As shown in FIG. 3A, a rotor body 88 receives a plurality of permanent magnets 90 and an outer ring 92. The body 88 extends between a first end 94 and a second end 96. An outer diameter of the ring 92 is shown as $D_1$. In an embodiment, $D_1$ is 1.960 inches (4.98 centimeters)+/−0.01 inch (0.025 centimeter). A second distance $D_2$ is the axial length of the body 88 between ends 94 and 96, and in one embodiment is 0.595 inch (1.511 centimeters)+/−0.01 inch (0.025 centimeter).

Figure 3B:
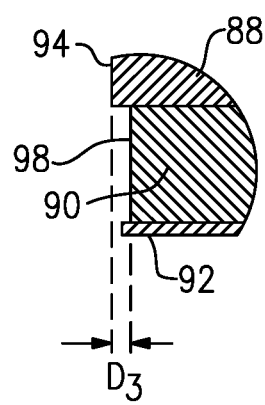
FIG. 3B shows a detail from FIG. 3A.

FIG. 3B is a detail of FIG. 3A. As can be seen, the end 94 of the body 88 extends outwardly of an end 98 of the magnets 90. The ring 92 is also shown. In embodiments, the magnets 90 are axially shorter than the body 88 by a distance $D_3$, which is 0.030 inch (0.076 centimeter), +/−0.01 inch (0.025 centimeter). Ring 92 is also shorter than body 88, but longer than magnets 90. It should be understood the same relative lengths are found at end 96.

Figure 3C:
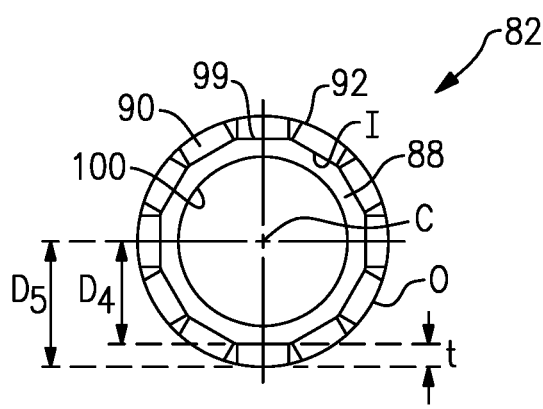
FIG. 3C is an end view of the rotor.

FIG. 3C is a front view of the rotor 82. As shown, the body 88 receives the magnets 90 on flats 99, and the ring 92. A distance $D_4$ is measured as a radius from the axis C of a cylindrical bore 100 defined by the body 88 perpendicularly to the flat 99. Magnets 90 in one embodiment are generally rectangular. In fact, an inner surface I is flat, but an outer surface O is rounded off to fit within ring 92. In embodiments, $D_4$ is 0.780 inch (1.981 centimeters). A dimension $D_5$ is shown, which is a radius from the axis C of the bore 100 perpendicularly through magnet outer surface O. In embodiments, $D_5$ was 0.960 inch (2.438 centimeters). A magnet thickness t can be taken as the difference between $D_4$ and $D_5$. Thickness t is thus 0.180 inch (0.457 centimeter). These dimensions are +/−0.10 inch (0.025 centimeter).

Figure 3D:
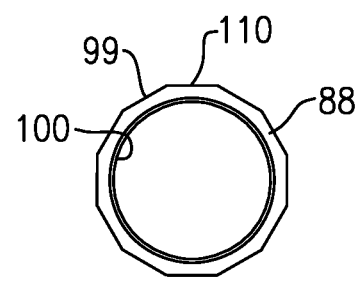
FIG. 3D shows details of one portion of the rotor.

FIG. 3D shows details of body 88 including cylindrical bore 100 and flats 99 on an outer peripheral surface 110. In an embodiment, there are 12 flats and 12 permanent magnets.

In an embodiment, a ratio of $D_1$ to $D_2$ is between 3.2 and 3.4. A ratio of $D_1$ to t is between 10 and 12. A ratio of $D_2$ to t is between 3.0 and 3.6.

The permanent magnet generator of this disclosure also operates at an rpm of approximately 11,831 rpms.

A method of replacing a permanent magnet rotor in an integrated drive generator comprises the steps of removing an existing permanent magnet rotor from an integrated drive generator. The integrated drive generator includes an input shaft driving a differential. The differential provides an output drive to a generator for generating electricity and is also connected to rotate the existing permanent magnet rotor. This then replaces the existing permanent magnet rotor with a replacement permanent magnet rotor. The replacement permanent magnet rotor includes a rotor body extending between a first end and a second end, a cylindrical bore and a plurality of flats on an outer peripheral surface. Permanent magnets are mounted on the flats. An outer ring surrounds the permanent magnets and defining an outer diameter. A ratio of the outer diameter to a length between the first and second ends is between 3.2 and 3.4.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A rotor for a permanent magnet generator comprising:
a rotor body extending between a first end and a second end, having a cylindrical bore and a plurality of flats on an outer peripheral surface;
permanent magnets positioned at said flats;
an outer ring surrounding said permanent magnets and defining an outer diameter, and a ratio of said outer diameter to an axial length between said first and second ends of said rotor body being between 3.2 and 3.4;
wherein there are 12 of said flats and said permanent magnets;
wherein a thickness of each said permanent magnet is defined as a difference between a radius from a center axis of said cylindrical bore to a magnet outer surface of said permanent magnets, subtracted by a radius from said center axis and extending perpendicular to an outer surface of one of said flats, and a ratio of said axial length to said thickness being between 3.0 and 3.6;
wherein a ratio of said outer diameter to said thickness being between 10 and 12; and
wherein said permanent magnets also extend between a first and a second end, and said first and second ends of said permanent magnets being axially inward of said first and second ends of said rotor body.

2. The rotor as set forth in claim 1, wherein said outer ring is axially shorter than said rotor body, and axially longer than said magnets.

3. The rotor as set forth in claim 2, wherein each of said magnets are spaced inwardly from a respective end of said rotor body by 0.030 inch (0.076 cm)+/−0.01 inch (0.025 cm).

4. An integrated drive generator comprising:
an input shaft configured to drive a carrier, said carrier configured to drive a gear differential to provide an input into a main generator, said main generator being configured to produce power for use on an associated system, said gear differential being further configured to drive a permanent magnet rotor positioned adjacent a stator, said permanent magnet generator configured to provide power for use;
said permanent magnet rotor having a body extending between a first end and a second end having a cylindrical bore and a plurality of flats on an outer peripheral surface;
permanent magnets positioned at said flats, and an outer ring surrounding said permanent magnets, and defining an outer diameter, and a ratio of said outer diameter to an axial length between said first and second ends of rotor body being between 3.2 and 3.4;
wherein there are 12 of said flats and said permanent magnets;
wherein a thickness of each said permanent magnet is defined as a difference between a radius from a center axis of said cylindrical bore to a magnet outer surface of said permanent magnets, subtracted by a radius from said center axis and extending perpendicular to an outer surface of one of said flats, and a ratio of said axial length to said thickness being between 3.0 and 3.6;
wherein a ratio of said outer diameter to said thickness being between 10 and 12; and
wherein said magnets also extend between a first and a second end, and said first and second ends of said permanent magnets being axially inward of said first and second ends of said rotor body.

5. The integrated drive generator as set forth in claim 4, wherein said outer ring is axially shorter than said rotor body, and axially longer than said magnets.

6. The integrated drive generator as set forth in claim 5, wherein each of said magnets are spaced inwardly from a respective end of said rotor body by 0.030 inch (0.076 cm)+/−0.01 inch (0.025 cm).

7. A method of replacing a permanent magnet rotor in an integrated drive generator comprising the steps of:
a) removing an existing permanent magnet rotor from an integrated drive generator, wherein the integrated drive generator includes an input shaft configured to drive a carrier, said carrier configured to drive a gear differential, and an output of said gear differential configured to provide an input for a main generator, said main generator configured to produce power, and said gear differential further being configured to drive said existing permanent magnet rotor; and b) replacing said existing permanent magnet rotor with a replacement permanent magnet rotor, the replacement permanent magnet rotor including a rotor body extending between a first end and a second end, and having a cylindrical bore and a plurality of flats on an outer peripheral surface, permanent magnets positioned at said flats, and an outer ring surrounding said permanent magnets, and an outer ring surrounding said permanent magnets, and defining an outer diameter, and a ratio of said outer diameter to a length between said first and second ends being between 3.2 and 3.4; wherein there are 12 of said flats and said permanent magnets; wherein a thickness of said magnet is defined as a difference between a radius from a center axis of said cylindrical bore to a magnet outer surface of said permanent magnets, subtracted by a radius from said center axis and extending perpendicular to an outer surface of one of said flats, and a ratio of said axial length to said thickness being between 3.0 and 3.6; and wherein a ratio of said outer diameter to said thickness being between 10 and 12.

8. The method of replacing a permanent magnet rotor as set forth in claim 7, wherein said magnets also extend between first and second ends, and said first and second ends of said permanent magnets being axially inward of said first and second ends of said body.

9. The method as set forth in claim 7, wherein a thickness of said magnet is defined as a difference between a radius from a center axis of said cylindrical bore to a magnet outer surface of said permanent magnets, subtracted by a radius from said center axis and extending perpendicular to an outer surface of one of said flats, and a ratio of said axial length to said thickness being between 3.0 and 3.6.

* * * * *